United States Patent
Ding et al.

(10) Patent No.: US 12,452,403 B2
(45) Date of Patent: Oct. 21, 2025

(54) METHODS AND DEVICES FOR VIDEO CODEC PERFORMANCE MEASUREMENT AND EVALUATION

(71) Applicant: Tencent America LLC, Palo Alto, CA (US)

(72) Inventors: Ding Ding, Palo Alto, CA (US); Xin Zhao, San Jose, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 18/773,787

(22) Filed: Jul. 16, 2024

(65) Prior Publication Data
US 2025/0030832 A1   Jan. 23, 2025

Related U.S. Application Data

(60) Provisional application No. 63/527,268, filed on Jul. 17, 2023.

(51) Int. Cl.
*H04N 17/00* (2006.01)

(52) U.S. Cl.
CPC ................................. *H04N 17/00* (2013.01)

(58) Field of Classification Search
CPC .... H04N 17/00; H04N 17/002; H04N 17/004; H04N 17/02; H04N 17/04; H04N 19/105; H04N 19/154; H04N 19/149
USPC ............ 348/180, 184, 192, 193; 375/240.12, 375/240.14
See application file for complete search history.

(56) References Cited

U.S. PATENT DOCUMENTS

| | | | |
|---|---|---|---|
| 8,842,185 B1* | 9/2014 | Spears | H04N 17/004 348/184 |
| 2008/0198234 A1* | 8/2008 | Nilsson | H04N 17/004 348/193 |
| 2013/0335522 A1 | 12/2013 | Zhang et al. | |
| 2014/0023138 A1 | 1/2014 | Chen | |
| 2018/0332281 A1 | 11/2018 | Yu et al. | |

FOREIGN PATENT DOCUMENTS

WO   WO 2023/123497 A1   7/2023

OTHER PUBLICATIONS

International Search Report and Written Opinion in PCT Application No. PCT/US24/38303 dated Oct. 16, 2024 (7 pages).

(Continued)

*Primary Examiner* — Sherrie Hsia
(74) *Attorney, Agent, or Firm* — Crowell & Moring LLP

(57) ABSTRACT

This disclosure relates generally to video coding/decoding and particularly for evaluating codec performance. One method includes obtaining a first plurality of anchor data points; obtaining a second plurality of test data points; analyzing monotonicity conditions of the first plurality of anchor data points and the second plurality of test data points; determining a fitting algorithm based on the analyzed monotonicity conditions; fitting the first plurality of anchor data points with the fitting algorithm to obtain an anchor curve; fitting the second plurality of test data points with the fitting algorithm to obtain a test curve; and evaluating the test codec performance based on the anchor curve and the test curve, to obtain an evaluation result.

20 Claims, 12 Drawing Sheets

(56) References Cited

OTHER PUBLICATIONS

Laude et al., "A Comprehensive Video Codec Comparison", APSIPA Transactions on Signal and Information Processing: vol. 8: No. 1, e30, 16 pages, Retrieved from the internet: www.nowpublishers.com/article/OpenAccessDownload/SIP-~35 >.

* cited by examiner

METHODS AND DEVICES FOR VIDEO CODEC PERFORMANCE MEASUREMENT AND EVALUATION

INCORPORATION BY REFERENCE

This application is based on and claims the benefit of priority to U.S. Provisional Application No. 63/527,268, filed on Jul. 17, 2023, which is herein incorporated by reference in its entirety.

TECHNICAL FIELD

This disclosure describes technologies related to video coding/decoding. More specifically, the disclosed technology involves enhancement on codec performance measurement and evaluation.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

Over recent decades, video streaming applications have gained significant popularity, driven by the increasing interest for both real-time and on-demand video content across various applications and platforms. Consequently, video streaming now represents the primary source of internet traffic, with an expected further surge in usage due to the proliferation of video-centric applications and advancements in video device capabilities. There is a pressing demand for the development of efficient video compression and delivery algorithms to effectively handle this anticipated growth

SUMMARY

The present disclosure describes various embodiments of methods, apparatus, and non-transitory computer-readable storage medium for enhancing codec performance measurement and evaluation, meeting a pressing need, addressing some issues/problems with some implementations, improving video encoding/decoding efficiency, enhancing video encoding/decoding performance, and/or advancing the video encoding/decoding technical field.

In various embodiments, when an evaluation result indicates that an anchor video codec outperforms a test video codec for a video streaming session, an encoded video bitstream encoded by the anchor video codec may be selected (or the anchor video codec may be selected to be used) for the video streaming session; and/or when the evaluation result indicates that the test video codec outperforms the anchor video codec, an encoded video bitstream encoded by the test video codec is selected (or the test video codec may be selected to be used) for the video streaming session, which may improve video encoding/decoding efficiency and enhance video encoding/decoding performance.

According to one aspect, an embodiment of the present disclosure provides a method for processing video data and evaluating codec performance, performed by an electronic device comprising a memory for storing instructions and a processor in communication with the memory. The method includes obtaining a first plurality of anchor data points, wherein: each anchor data point is generated based on an anchor video bitstream, the anchor video bitstream is encoded by an anchor video codec based on a reference video and an anchor encoding parameter set from a first plurality of encoding parameter sets, and each anchor data point represents an anchor codec performance corresponding to the anchor encoding parameter set; obtaining a second plurality of test data points, wherein: each test data point is generated based on a test video bitstream, the test video bitstream is encoded by a test video codec based on the reference video and a test encoding parameter set from a second plurality of encoding parameter sets, and each test data point represents a test codec performance corresponding to the test encoding parameter set; analyzing monotonicity conditions of the first plurality of anchor data points and the second plurality of test data points; determining a fitting algorithm based on the analyzed monotonicity conditions; fitting the first plurality of anchor data points with the fitting algorithm to obtain an anchor curve; fitting the second plurality of test data points with the fitting algorithm to obtain a test curve; and evaluating the test codec performance based on the anchor curve and the test curve, to obtain an evaluation result.

According to another aspect, an embodiment of the present disclosure provides an apparatus or device for evaluating video codec. The apparatus/device includes a memory storing instructions; and a processor in communication with the memory. When the processor executes the instructions, the processor is configured to cause the apparatus to perform the above methods for processing video data and evaluating codec performance.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
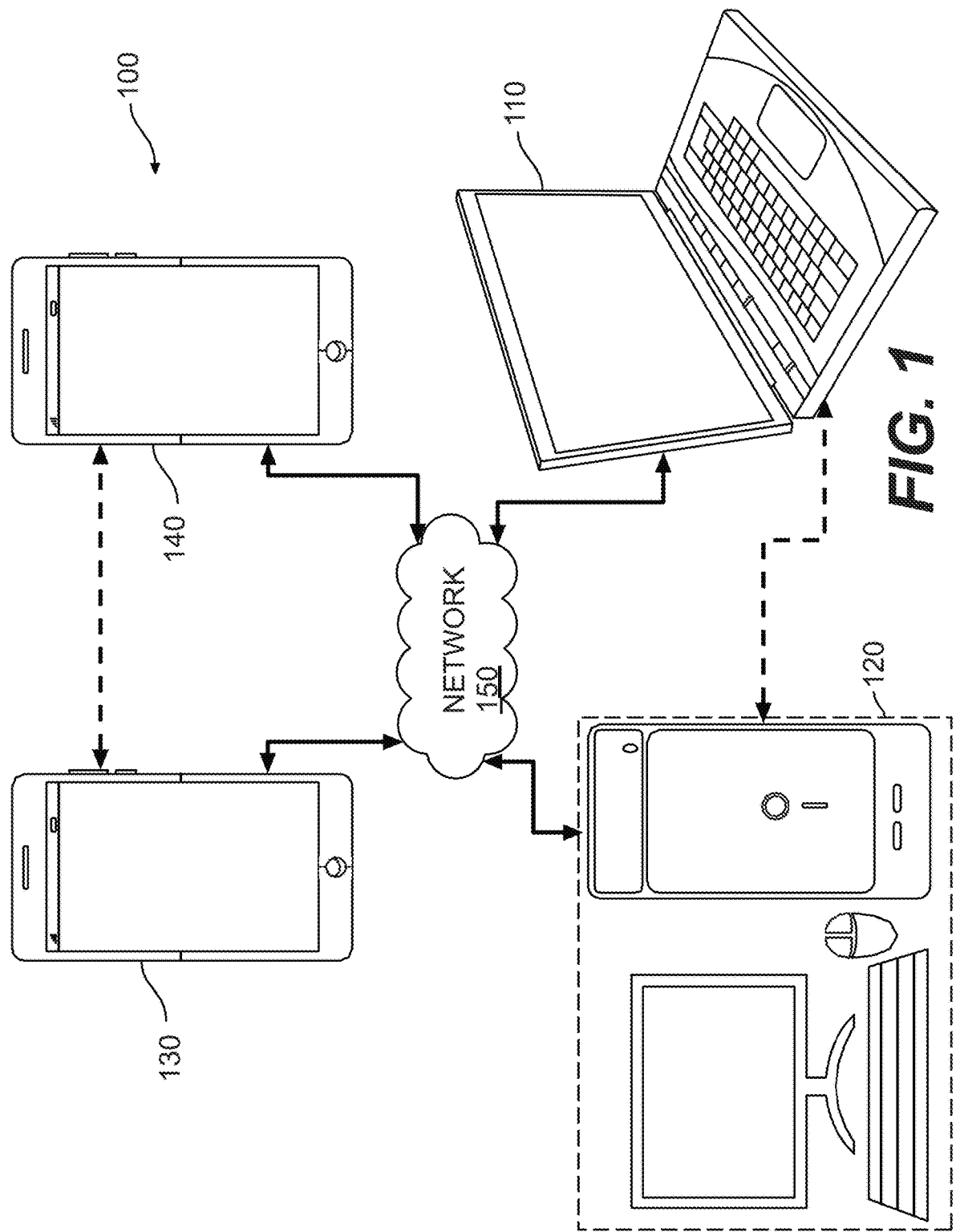
FIG. 1 shows a schematic illustration of a simplified block diagram of a computer/communication system (100) in accordance with an example embodiment.

As shown in FIG. 1, terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

The codec performance measuring and evaluation method provided in this disclosure may be applied to any electronic device, such as server or desktop computer 120, laptop computer 110, tablet computer 130 and 140, to compare the encoding performance of two encoders (also referred to as codec), and further select the codec with better performance as the actual encoder for use. The corresponding decoder for the encoder can be used in any electronic devices with decoding capabilities, such as TV terminals, PC terminals, mobile terminals, etc.

Figure 2:
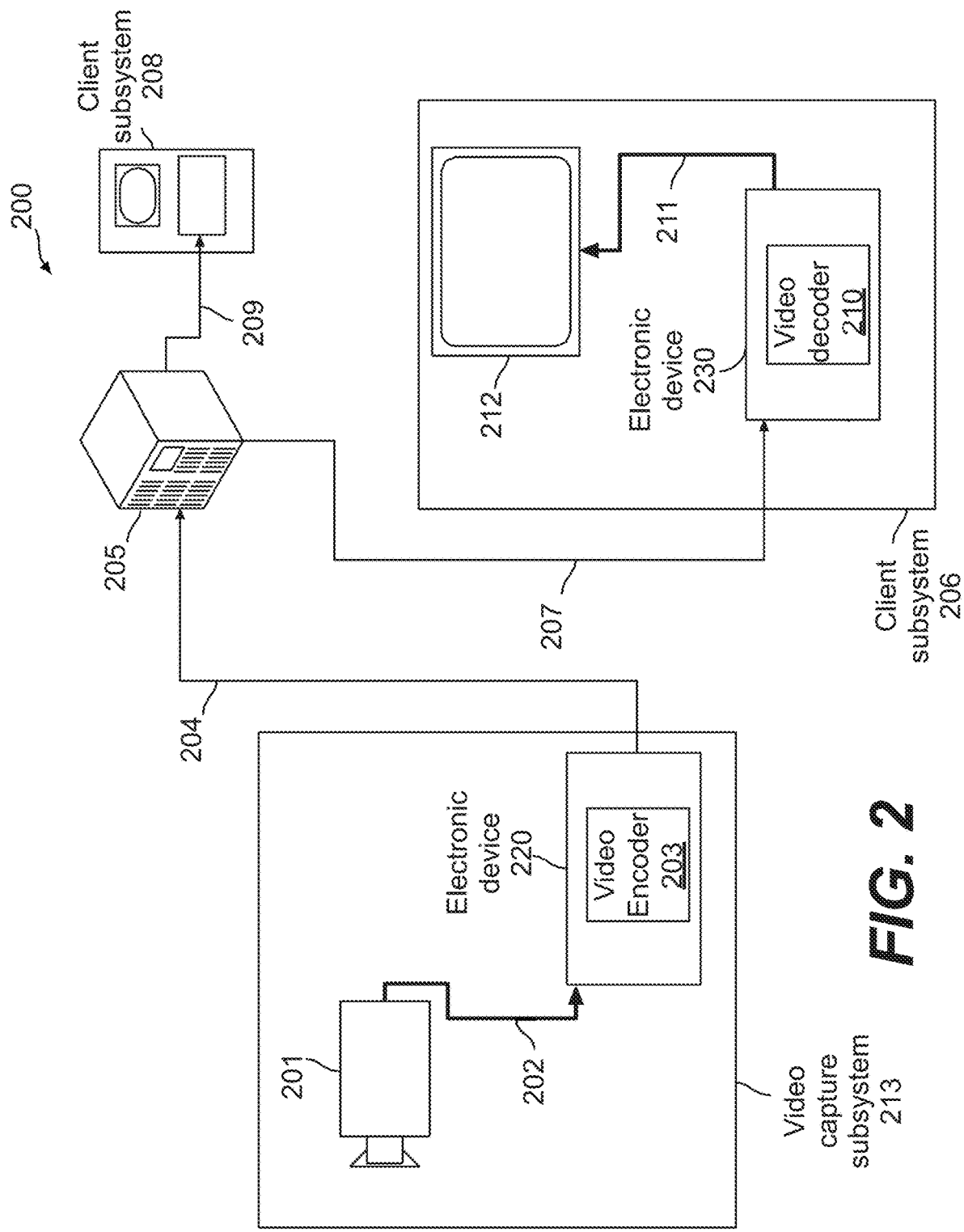
FIG. 2 shows a schematic illustration of a simplified block diagram of a computer/communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on. Specifically, the video encoder and/or decoder may be measured, evaluated, and benchmarked with the codec evaluation methods described in this disclosure.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source (201). The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
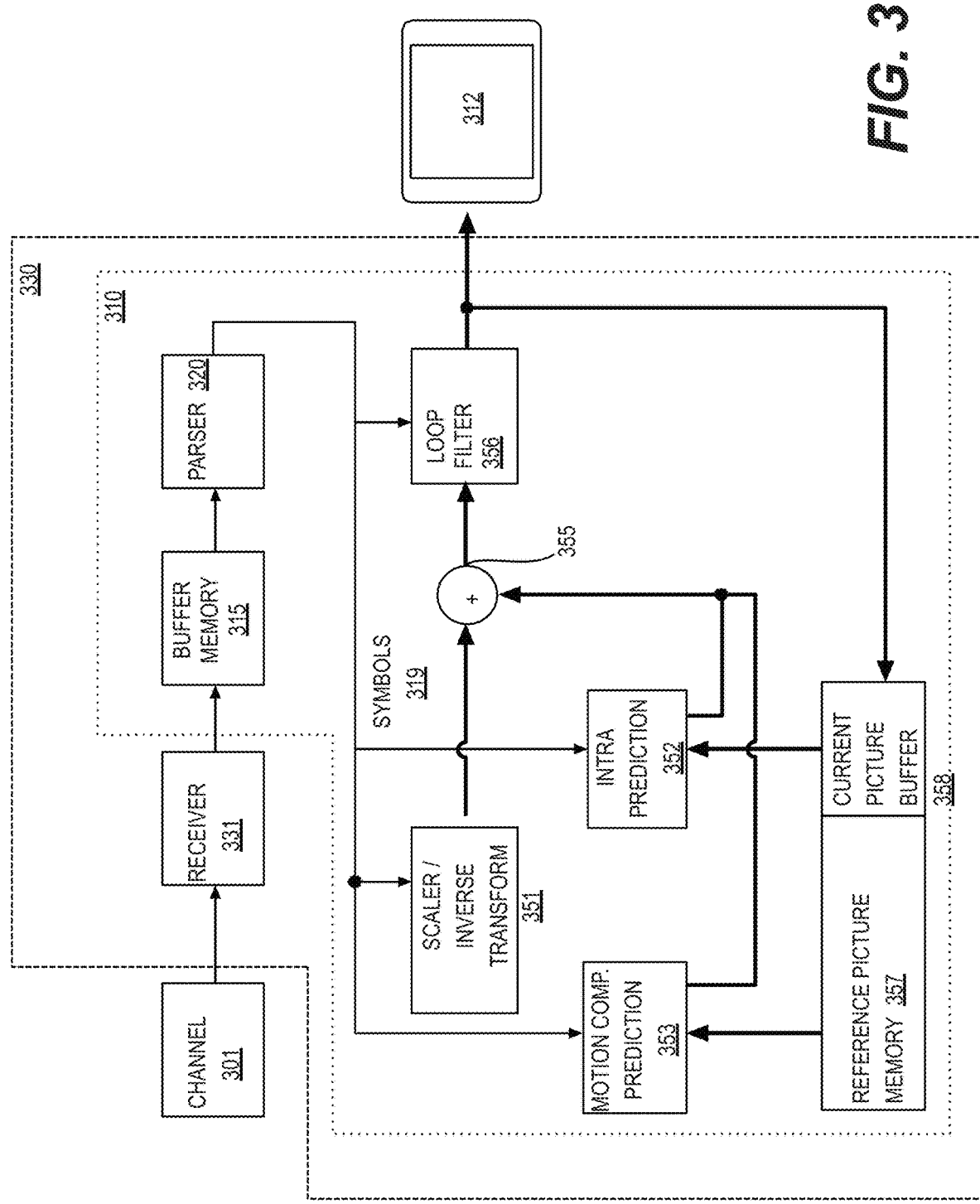
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
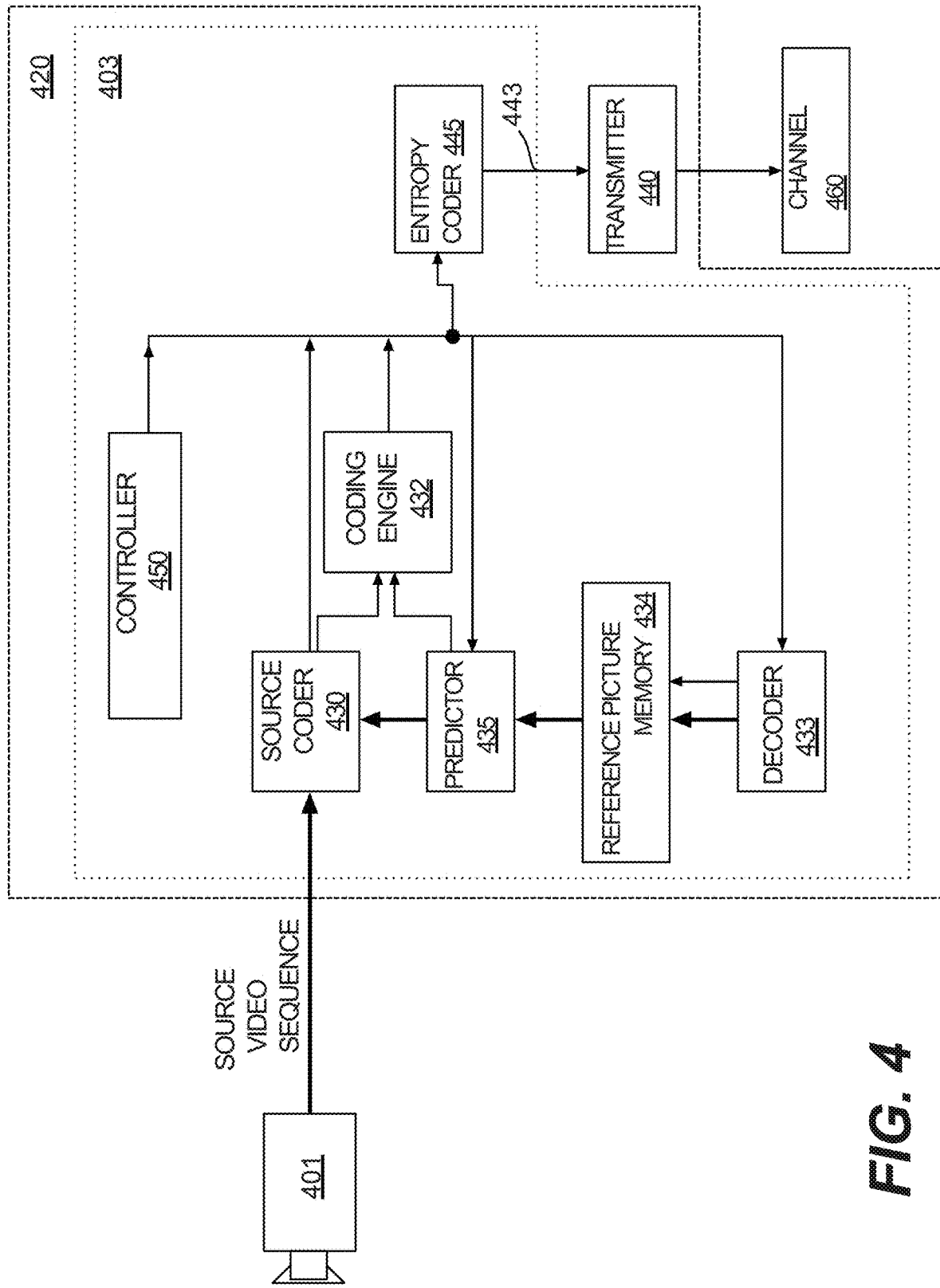
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bit-stream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive picture. Source pictures commonly may be subdivided spatially into a plurality of sample coding blocks as described in further detail below.

Figure 5:
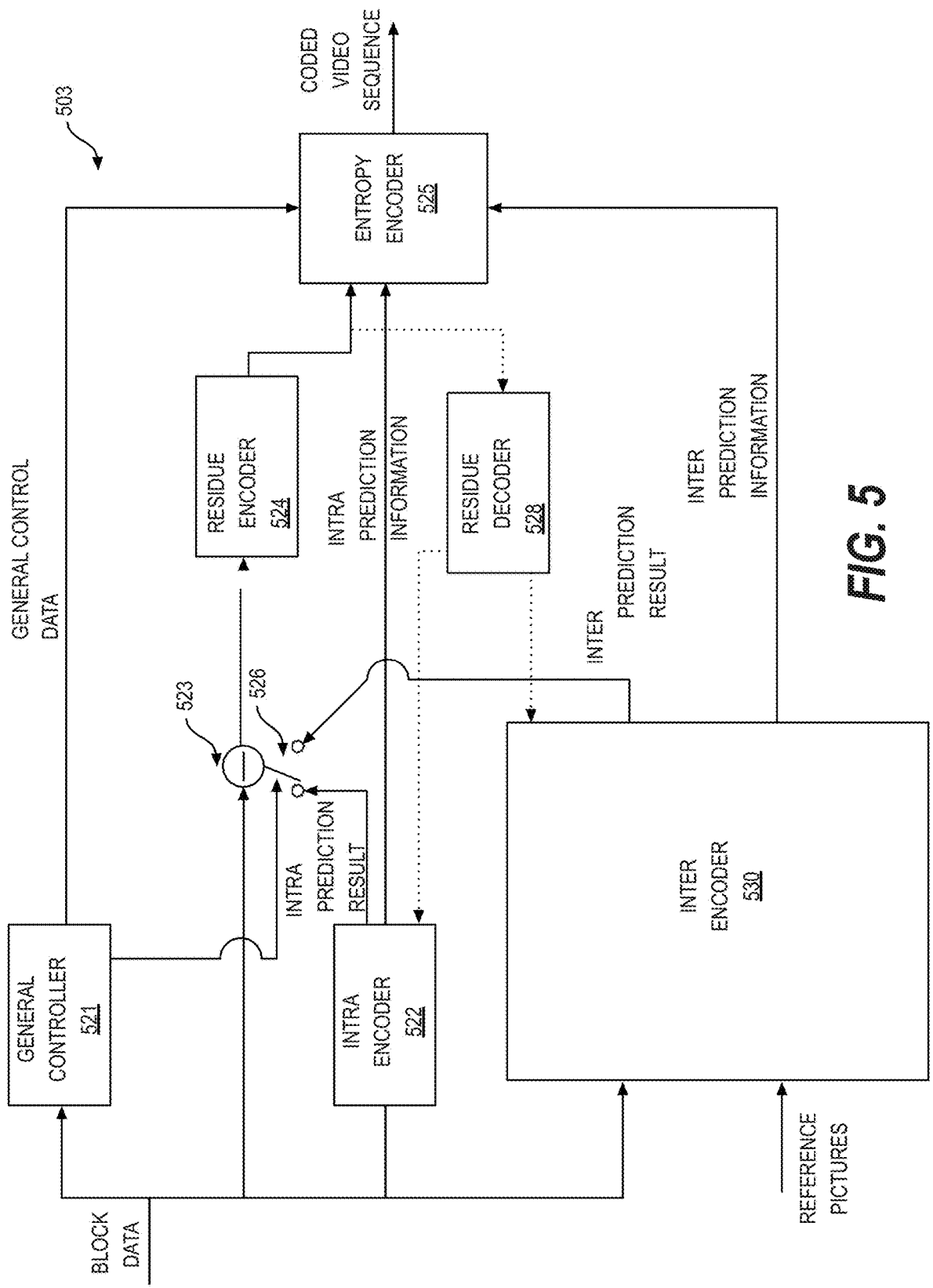
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
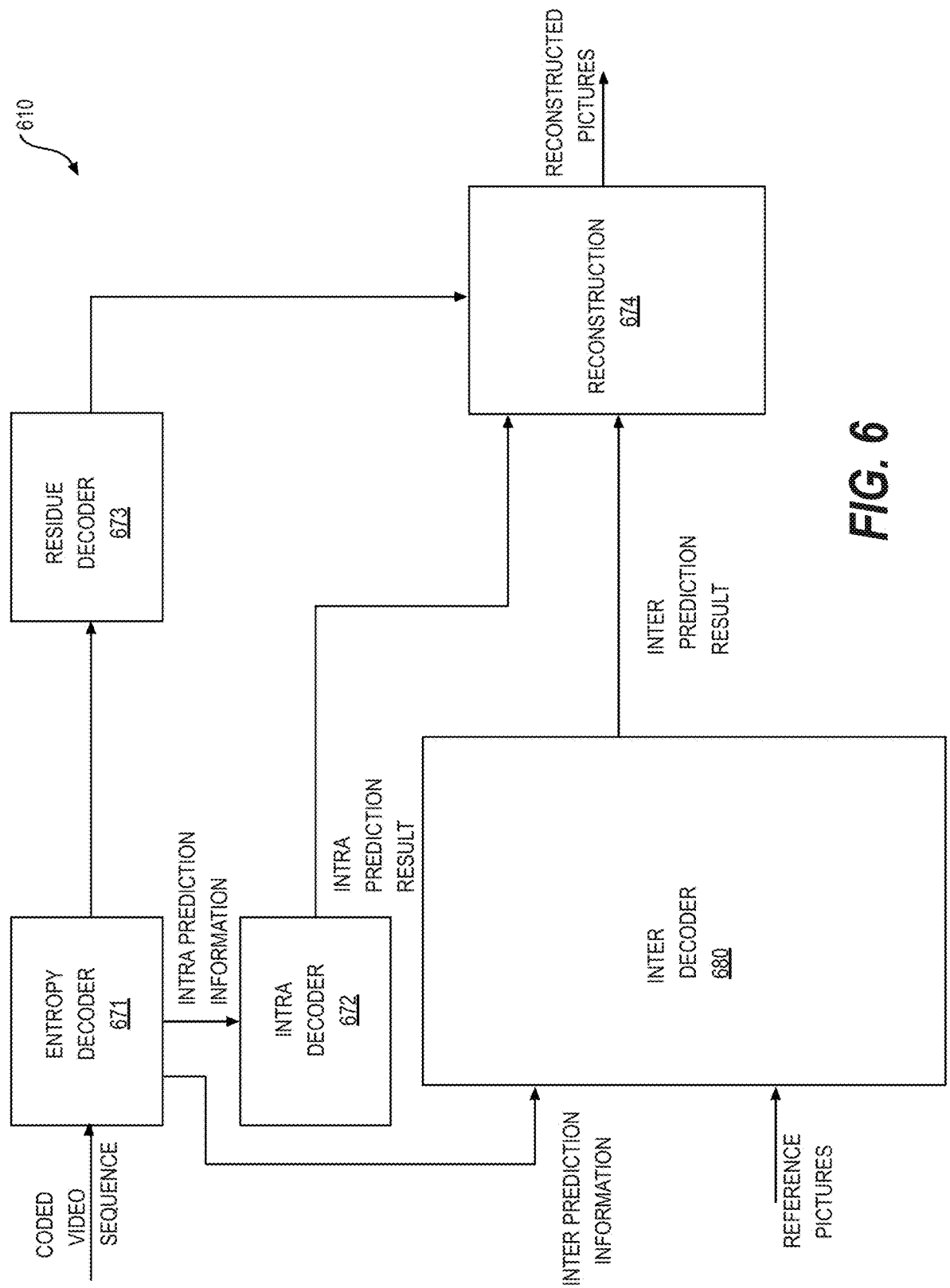
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Online video streaming services, such as YouTube, Netflix, and Vimeo, constitute a significant portion of internet traffic, and their dominance is set to increase further. The surging popularity of video streaming services can be primarily attributed to the widespread availability of higher network bandwidth and improved compression efficiency. This has been facilitated by the proliferation of video playback devices such as smartphones, tablets, and smart TVs. As a result, users now expect seamless streaming capabilities anytime, anywhere, on any device. Video compression emerges as one of the most effective and critical methods to reduce the size of media files, enabling faster and efficient transmission and delivery over networks. Video encoding/decoding technology plays a crucial role in meeting the growing demand for high-quality video content while optimizing bandwidth utilization. Considerable effort is being made towards developing more efficient video codecs.

One task in developing novel video codecs, or improving existing codecs, is measuring, evaluating, and comparing codec performances. Video codec evaluation tool and algorithm evaluate the effectiveness and efficiency of codecs in encoding and decoding video and/or audio data. The evaluation tool/algorithm is critical in determining a codec's capability to deliver high-quality video output while minimizing the resulting file size and mitigating the demands on data transmission bandwidth. A well-designed and robust evaluation tool is essential to accurately quantify the balance a codec should achieve between preserving video quality and optimizing compression ratios. Gaining a comprehensive, in-depth understanding of codec performance is essential to ensure optimal multimedia experiences across various platforms and applications. Factors such as streaming quality, file storage and bandwidth requirements, and overall user satisfaction are directly influenced by the performance characteristics of the employed codecs. Consequently, thorough codec performance testing plays a pivotal role in delivering seamless and high-quality multimedia content to end-users.

In the research and development process of multimedia codecs, Bjøntegaard Delta Peak Signal-to-Noise Ratio (BD-PSNR) and Bjøntegaard Delta rate (BD-rate) are often used as performance criteria to compare the performance of different codecs. BD-PSNR and BD-BR are used to compare and measure the visual quality difference and bitrate difference, respectively. The higher the BD-PSNR is, the better the encoding quality is. On the other hand, the lower the BD-BR is, the fewer bitrates are required for the encoded bitstream with same or similar quality.

Figure 7A:
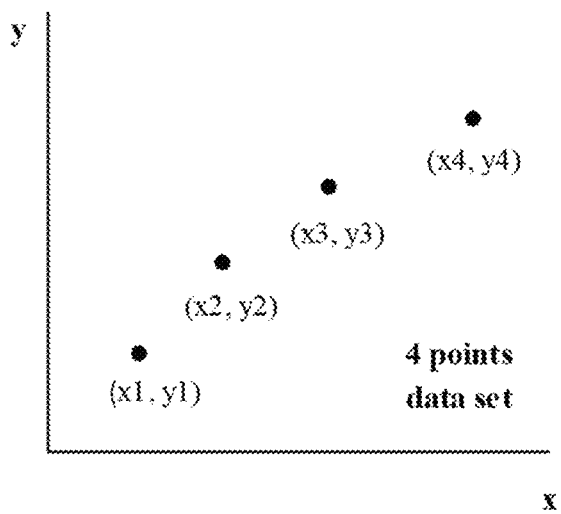
FIG. 7A shows example data sets used in Piecewise Cubic Hermit Interpolation (PCHIP)

Specifically, BD-PSNR is used to measure the average PSNR gain under the same bit rate conditions, while BD-rate is used to measure the average bit rate savings under the same PSNR conditions. Currently, a commonly used algorithm is based on Piecewise Cubic Hermit Interpolation (PCHIP), which constructs a cubic function using cubic spline interpolation for every two adjacent points. The data between these two points are obtained through interpolation. Here, the process is briefly described with reference to FIG. 7A. In this example, each group of data has four data points as input, denoted as (x1, y1), (x2, y2), (x3, y3), (x4, y4). Taking two points from left to right sequentially, the first step is to interpolate between the first and the second points (x1, y1), (x2, y2). The interpolation polynomial is solved through the input values and the first order derivative values of the two points, then the points between x1 and x2 are solved through the interpolation polynomial. The above solution process is repeated sequentially to obtain the piecewise interpolation polynomial in the interval from x1 to x4 (i.e., sequentially from x1 to x2, x2 to x3, and x3 to x4).

Figure 7B:
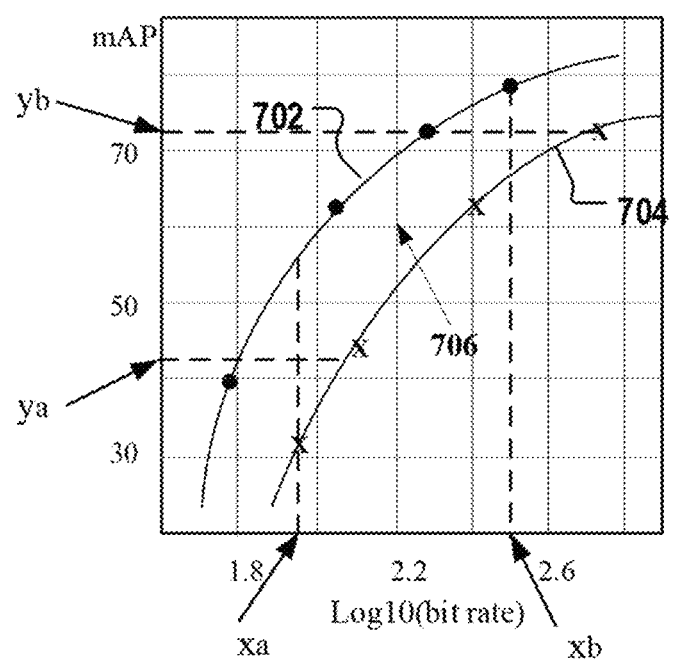
FIG. 7B illustrates the calculation of average BD-PSNR considering RD curves for two codecs.

Referring to FIG. 7B for an example implementation for a PCHIP based codec evaluation tool. A benchmark interpolation curve 702 is generated based on data points (or operating points, shown as solid dot points in FIG. 7B) corresponding to a benchmark codec (or referred to as anchor codec), and a test interpolation curve 704 is generated based on data points (marked as "X" in FIG. 7B) corresponding to a test codec. An interpolation curve may also be referred to as a fitting curve, as it is designed to fit the data points. The codec evaluation tool will then calculate the area of the region through the interpolation curve (i.e., the region 706 formed by the two fitting curves, and the two vertical dotted lines), and then calculates BD-PSNR and BD-rate based on the difference in the region between the benchmark fitting curve and the test fitting curve. Even though commonly used, the existing codec performance evaluation algorithm such as PCHIP, has a few limitations and deficiencies.

First, existing codec evaluation tools require that the input data (data points) follow a monotonically increasing pattern. When the input data is non-monotonic, the codec evaluation tool fails, resulting in unstable and unreliable evaluation outcomes. Consequently, existing codec evaluation tools mandate that input data strictly adheres to a monotonically increasing pattern, rendering them incapable of handling input data that does not conform to this requirement. This limitation impacts the versatility of codec evaluation tools, as for certain codecs, input data may not consistently follow a monotonic pattern (such as monotonically increasing pattern).

Figure 8A:
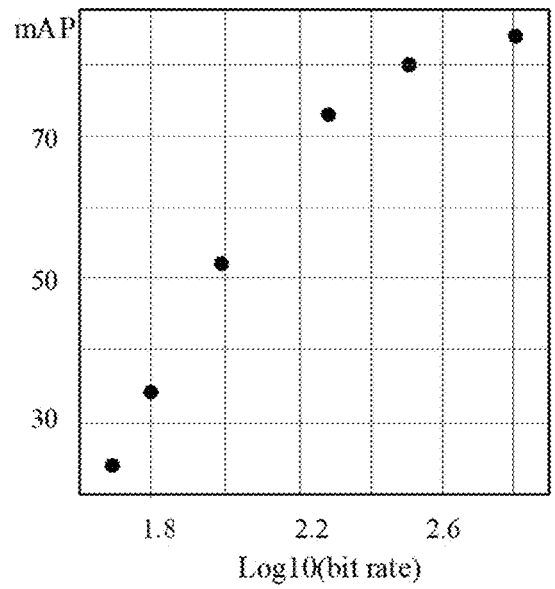
FIG. 8A shows data sets with data points following monotonical increasing pattern.
Figure 8B:
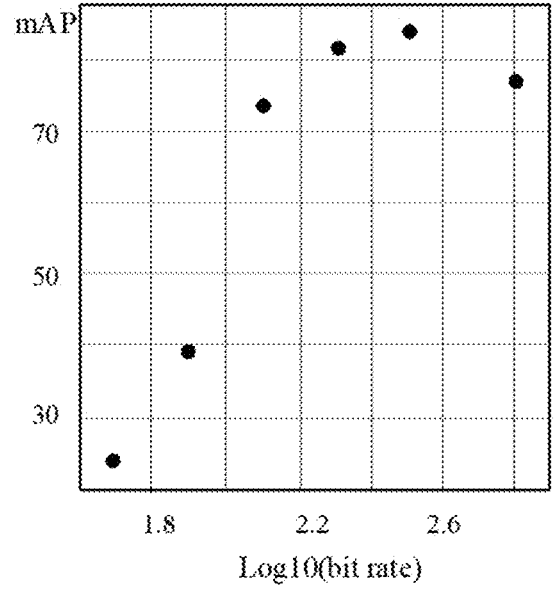
FIG. 8B shows data sets with data points not following monotonical increasing pattern.

FIG. 8A shows data points that satisfy the monotonicity requirement, whereas FIG. 8B shows and the data shown points that do not satisfy the monotonicity requirement (i.e., being non-monotonic). Note that in FIG. 8A and FIG. 8B, the x-axis represents bit rate, such as the bit rate in logarithmic format, and the y-axis represents a quality metric, such as a mean average precision (mAP).

Figure 8C:
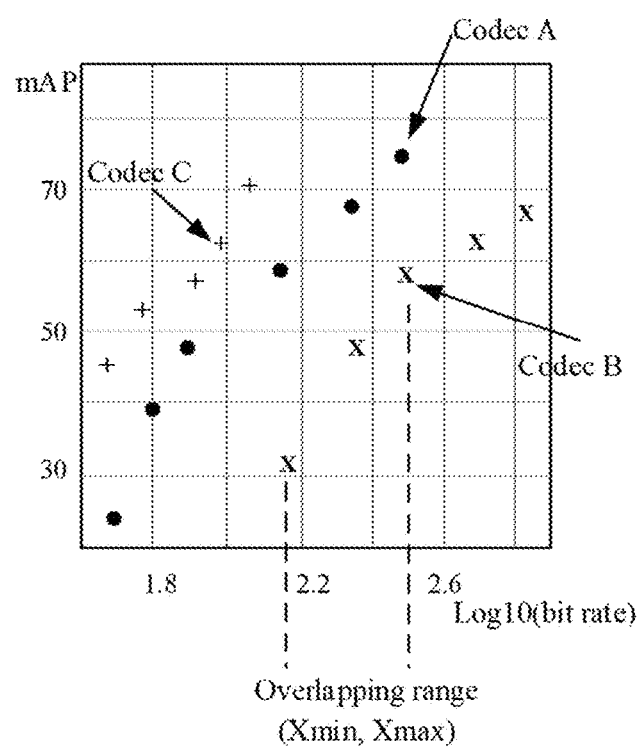
FIG. 8C shows overlapping data sets and non-overlapping data sets.

Second, for an existing codec evaluation tool to compare the performance of two codecs, the input data for each codec must have overlap, and the performance evaluation interval is restricted to be the overlapping part of the two set of data points. As shown in FIG. 8C, the solid dot data set represents performance measurements for codec A, while the "X" data set represents performance measurements for codec B. Existing codec evaluation tools may only yield valid evaluation results within the indicated overlapping range (i.e., overlapped bit rate range). Further, for data sets generated from various codecs, the overlapping condition may not always be satisfied. For example, as shown in FIG. 8C, the "+" data set represents performance measurements for codec C, and the "+" data set has no overlap with the "X" data set. In this scenario, existing codec evaluation tools will not be able to evaluate and compare the performance for codec B and codec C.

Figure 9:
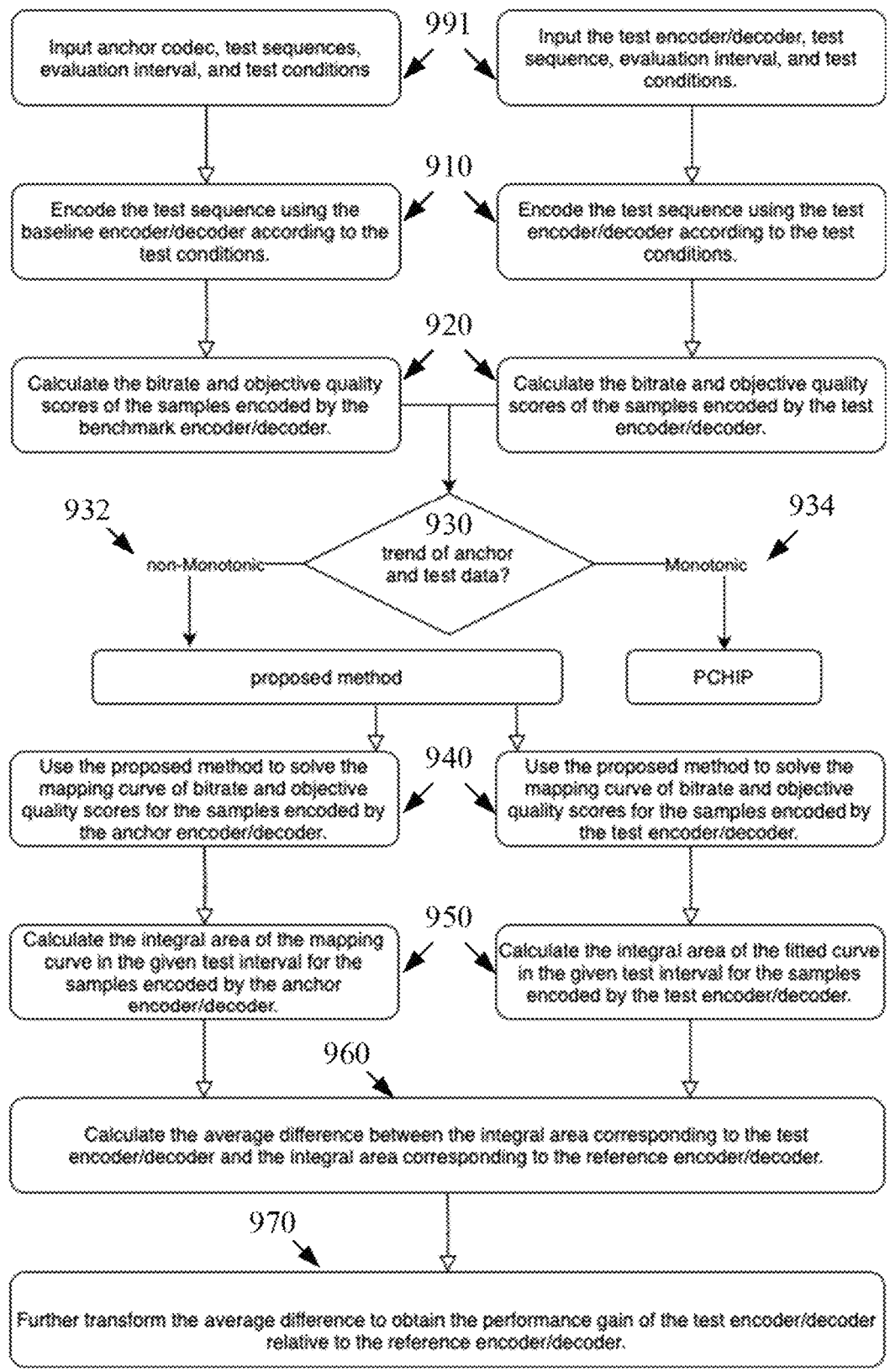
FIG. 9 shows an example codec evaluation method in accordance with an example embodiment.

FIG. 9 shows an example codec evaluation method, including a portion or all of the following steps. In some implementations, the steps may be performed at a step by step basis.

An input step (991) may include obtaining an input to the codec evaluation tool, which may include: a first video codec and a second video codec. Exemplarily, the first video codec may be a benchmark video codec, referred to as an anchor or anchor codec; the second video codec may be the codec that needs to be evaluated, referred to as a test or test codec. The input may further include a set of encoding parameters [c1, c2, . . . , $c_n$], where n is an integer. These parameters may include, for example, spatial and temporal parameters (e.g., resolutions of the video), quantization parameters, coding bitrates, color bit depth, chroma subsampling schemes, etc. The input may further include one or more reference video S, and performance evaluation intervals. The intervals may include a range on the x-axis (the first axis), denoted as [xa,xb] (ranging from xa to xb, inclusive), or a range on the y-axis (the second axis), denoted as [ya,yb]. The x-axis may represent a bit rate, or a transformation of bit rate (e.g., bit rate in logarithmic format). The y-axis may represent a quality metric, which may include, but is not limited to, Peak Signal-to-Noise Ratio (PSNR), mAP, Multiple Object Tracking Accuracy (MOTA), Bjøntegaard Delta MOTA (BD-MOTA), Structural Similarity Index (SSIM), or Video Quality Metric (VQM). The quality metric may be used to assess the fidelity or perceptual quality of the video content.

In some example implementations, the same set of encoding parameters may be used to both the first video codec and the second video codec. In some example implementations, the first video codec and the second video codec may use different sets of encoding parameters. In some example implementations, for each encoding parameter, an encoded video bit stream may be encoded by a codec; and/or a corresponding data point (whether anchor data point or test data point) may be calculated. In some example implementations, multiple data points may be calculated from a same encoded video bit stream.

An output step may include display/save/send/transmit an output. For one example, an expected output may include the quantitative measure of the performance of the test relative to the anchor. The commonly used indicators may include the average objective quality improvement under the same bit rate (e.g., BD-PSNR), and the average bit rate saving under the same objective quality (e.g., BD-rate).

A portion or all of the following steps may be applicable to any existing codec performance comparison methods or tools.

A first step (e.g., step 910 in FIG. 9) involves encoding reference video source (denoted as S) separately for each encoding parameter (or namely operation point) using the anchor and the test. This results in two sets of encoded bitstreams to be used as source signal for codec performance evaluation, one set denoted as [$s_{a1}$, $S_{a2}$, . . . , $s_{an}$], and the other as [$s_{t1}$, $s_{t2}$, . . . , $s_{tn}$]. Here, "$s_{ak}$" represents the source signal (or encoded bitstream) encoded by the anchor codec from the reference video S using the ck configuration. Similarly, "$s_{tk}$" represents the source signal (or encoded bitstream) encoded by the test codec from the reference video S using the ck configuration. Where k is an integer from 1 to n.

For each of the operation point, a second step (e.g., step 920 in FIG. 9) is to calculate the bit rate value r and the quality scores q of the encoded source signal. This results in 4 sets of data:

1. [ra1, ra2, . . . , $r_{an}$]: This set represents the bit rate measurements of the source signal encoded by the anchor codec. For example, ra1 is the bit rate measurement of source signal sa1 (encoded by the anchor codec).
2. [qa1, qa2, . . . , $q_{an}$]: This set represents the objective quality measurements of the video encoded by the anchor codec. For example, $q_{a1}$ is the objective quality measurement of source signal $s_{a1}$.
3. [rt1, rt2, . . . , $r_{tn}$]: This set represents the bit rate measurements of the source signal encoded by the test codec. For example, rt1 is the bit rate measurement of source signal st1 (encoded by the test codec).
4. [qt1, qt2, . . . , $q_{tn}$]: This set represents the objective quality measurements of the source signal encoded by the test codec. For example, qt1 is the objective quality measurement of source signal st1.

Figure 8D:
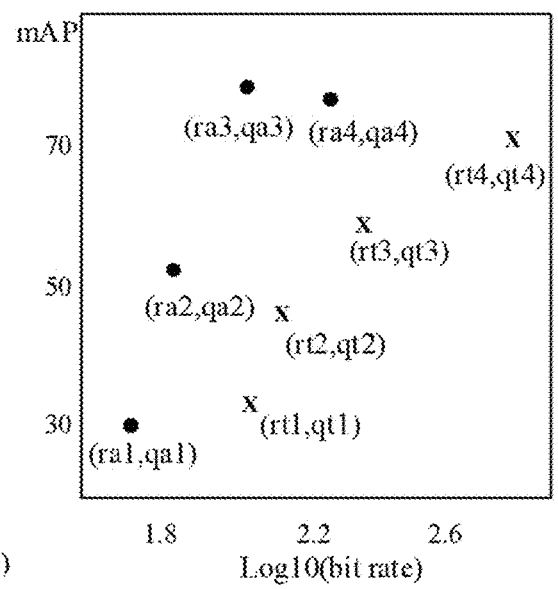
FIG. 8D shows example data sets for two codecs and coordinate for each data point in the data sets.

By taking the bit rate measurement r as the x-axis and the objective quality q as the y-axis, these four sets of data collectively form one set of anchor data points for anchor codec performance and one set of test data points for test codec performance. Referring to FIG. 8D for an example, the four solid dots form a set of anchor data points for the anchor codec, while the four "x" form a set of test data points for the test codec. Note that these data points are discrete data points. If the two sets of data (represented by "x" and dots) contain points with identical x-axis values, one can determine which codec (anchor or test) performs better by comparing their respective y-axis values. However, in practice, finding such points may be challenging or impossible. Therefore, it is proposed to fit each set of data points (i.e., anchor data point set and test data point set) with a nonlinear relationship fitting curve. This approach enables a quantitative comparison between the anchor and test codecs, facilitating a more meaningful assessment of their performance.

In some implementations, the set of anchor data points and the set of test data points may have various monotonicity or be non-monotonic. For a non-limiting example, as shown in FIG. 8D, the four solid dots corresponding to the set of anchor data points for the anchor codec may show a non-monotonic behavior, while the four "x" corresponding to the set of test data points for the test codec may show an increasing monotonicity.

In some implementations, each anchor data point represents an anchor codec performance using the corresponding encoding parameter, the anchor data point being formatted as a two-tuple including (i) a bit rate or a variation of the bit rate and (ii) a quality measurement. Each test data point represents a test codec performance using the corresponding encoding parameter, the test data point being formatted as the two-tuple including (i) a bit rate or a variation of the bit rate and (ii) a quality measurement.

In some example implementations, the set of anchor data points for the anchor codec and the set of test data points for the test codec have overlap (e.g., in x-axis).

In some example implementations, the set of anchor data points for the anchor codec and the set of test data points for the test codec do not have overlap (e.g., in x-axis). In this case, extrapolating at least one data set may be applied.

In some example implementations, when deriving the fitting curves, a specific x-axis value range, such as [xa, xb] may apply. The range may be determined by practical requirements, such as a bitrate range suitable for a particular video streaming environment. It's important to note that this range may be adjusted to accommodate different use case scenarios.

In some example implementations, when deriving the fitting curves, a specific y-axis value range, such as [ya, yb] may apply. The range may be determined by practical requirements, such as a quality requirement for a particular video streaming environment. It's important to note that this range may be adjusted to accommodate different use case scenarios.

In a third step (e.g., step 930 in FIG. 9), a pre-analysis on these result data from the second step is performed, and based on the pre-analysis, different curve fitting methods may be applied.

In some implementations, a pre-analysis on the input data is performed to determine whether the input data is monotonic or not.

In some implementations, based on the outcome of the pre-analysis, a curve-fitting method based on polynomial function (e.g., cubic or higher order) is applied.

In some implementations, based on the outcome of the pre-analysis, a curve-fitting method based on PCHIP (Piecewise Cubic Hermite Interpolation) is applied.

In some implementations, based on the outcome of the pre-analysis, a curve-fitting method based on Constrained Cubic Curve Fitting is applied.

In some implementations, when a pre-analysis on the input data is performed and determined the input data to be monotonic, a polynomial function or PCHIP is used for curve fitting; when a pre-analysis on the input data is performed and determined the input data to be non-monotonic, a Constrained Cubic Curve Fitting is applied.

In some implementations, the above input dependent curve fitting method can be applied for measuring codec performance, and further steps are described in the followings.

In some implementations, when both the anchor and test data are monotonic, the calculation of BD-rate can be achieved utilizing the cubic polynomial curve fitting, or Piecewise Cubic Hermite Interpolating Polynomial (PCHIP) methodology. For example, the PCHIP method is used as shown in step 934 in FIG. 9. In some implementations, this method provides an advantageous means of obtaining the rate-distortion performance between the two codecs, preserving the monotonicity of the original data points.

In some implementations, when the data sets from the anchor or the test does not exhibit a monotonic relationship, a subsequent procedure is required to initially fit the data: when either the anchor data or the test data, or both, do not exhibit a monotonic trend (i.e., when one or both of the anchor data and the test data is non-monotonic), a different curve fitting method (e.g., a constrained cubic curve fitting) is applied, as shown in step 932 in FIG. 9. In some implementations, this method may use the data already obtained for each set to fit a nonlinear relationship curve; and as such, a quantitative comparison is made possible.

Step 940 may include using the proposed method (e.g., constrained cubic curve fitting) to solve the mapping curve of bitrate and objective quality scores for the samples encoded by the anchor encoder/decoder and the test encoder/decoder, respectively. In some implementations, step 940 may include using the proposed method to calculate nonlinear curve between bitrate and objective measurement from anchor coded bitstreams and test coded bitstreams, respectively.

Numerically fit the anchor data points, that is, data points with [ra1, ra2, . . . , $r_{an}$] as x-axis values and [qa1, qa2, . . . , $q_{an}$] as y-axis values (e.g., (ra1, qa1), (ra2, qa2), . . . (ran, $q_{an}$)). Assume the relationship between r (bitrate, x-axis value) and q (objective quality, y-axis value) can be represented by the following polynomial function:

$$fa(x) = b_0 x^3 + b_1 x^2 + b_2 x + b_3 \quad (1)$$

wherein b0, b1, b2, and b3 are coefficients controlling the shape of the curve, and x is the input parameter (in this example, it corresponds to r), y (f(x)) is the output value (in this example, it corresponds to q).

In some example implementations, when numerically fitting the anchor data points, a special constraint for this polynomial may be added which requires its first order derivative to be positive (or non-negative). A further constraint may be added which requires its second order derivative to be negative (or non-positive). These constraints may be imposed in a given x range (e.g., a bit rate range). The first constraint may ensure the fitting curve to be monotonic increasing, and the second constraint may ensure the fitting curve to be convex. Another special constraint for this polynomial is that its first order derivative to be positive in the given x range, which ensures the curve to be monotonic increasing. Another special constraint for this polynomial is that its first order derivative to be negative in the given x range, which ensures the curve to be monotonic decreasing. The first order derivative is:

$$f'(x) = 3b_0 x^2 + 2b_1 x + b_2 \quad (2)$$

and the second derivative is:

$$f'(x) = 3b_0 x^2 + 2b_1 x + b_2 \quad (3)$$

In some example implementations, the first order derivative of the polynomial needs to be negative.

In some example implementations, a further constraint is imposed, such that f(min(x))>0 and f(max(x))<100, where min(x) and max(x) represent the minimum and maximum values of x, respectively.

The fitting curve could be obtained by solving, for example, a typical nonlinear curve-fitting problem. For example, parameters b0, b1, b2, b3 may be obtained by minimizing least square error between observed values and fitted values with any suitable optimization method.

As an example, let (x_i, y_i) for i in [1, 2, . . . , N] denote the bitrate and metric value of a data point (e.g., a data point as shown in FIG. 8D). N=6 is the number of encoding parameters (e.g., 6 Quantization Parameters (QP)). The least square error between observed values and fitted values with any suitable optimization method may be solved using equation below:

$$\min_{b0,b1,b2,b3} \Sigma_{i \text{ in } [1,2,..,N]} [y_i - f(x_i)]^2 \quad (4)$$

Figure 10:
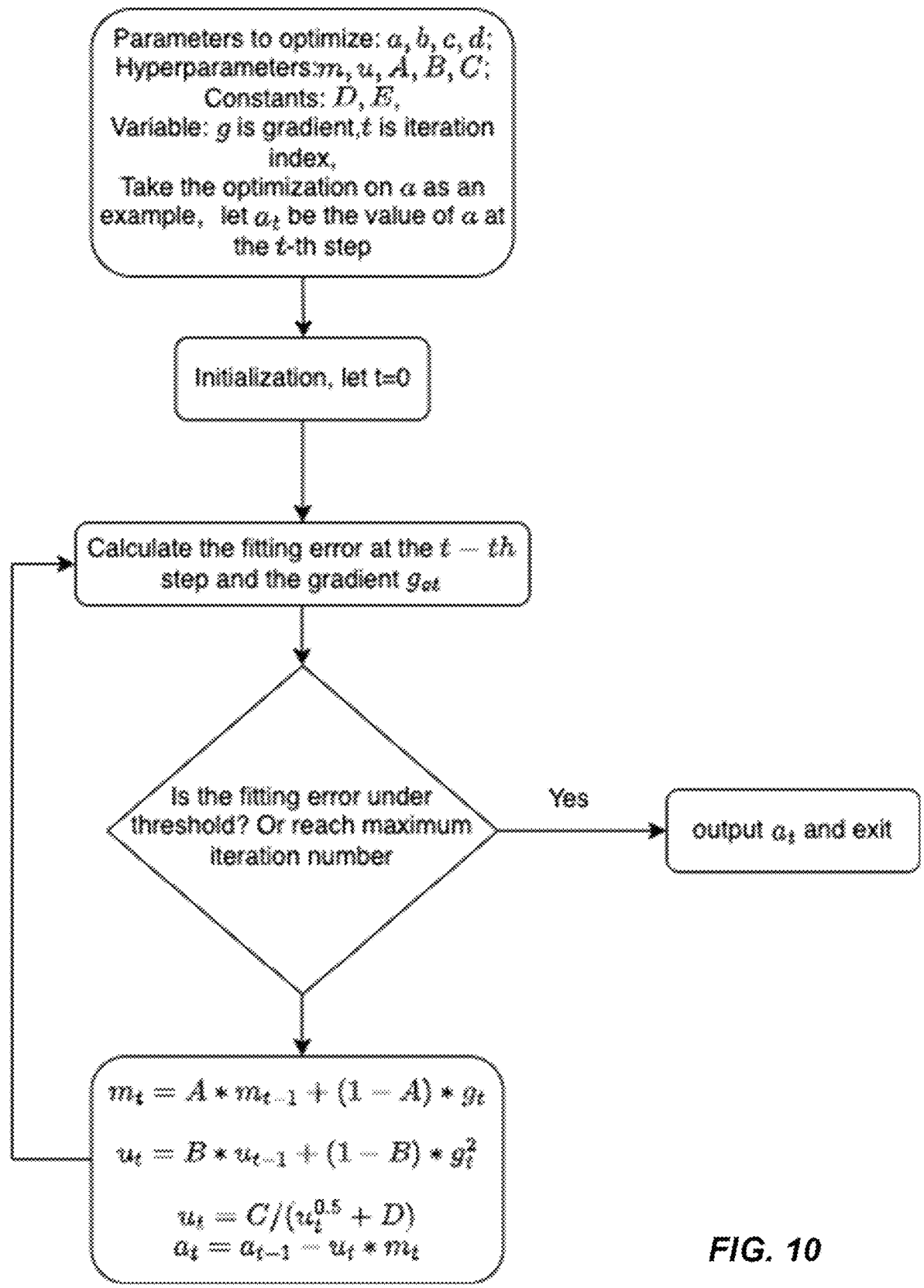
FIG. 10 illustrates an exemplary process for solving the polynomial parameters using an iterative parameter optimization procedure.

As another example, FIG. 10 illustrates an exemplary process for solving the parameters b0, b1, b2, b3 using an iterative parameter optimization procedure. In FIG. 10, the to-be-optimized parameters a, b, c, and d correspond to parameters b0, b1, b2, and b3 in the above polynomial function, respectively.

After applying the optimization process described above, we obtain the nonlinear curve, i.e. fa(x), between the anchor bitrates and quality measurements, i.e., [ra1, ra2, . . . , $r_{an}$] and [qa1, qa2, . . . , $q_{an}$]. FIG. 7B shows an example nonlinear curve 704 as the fitting curve for the anchor codec data points (denoted by "X").

For the test data, i.e., [rt1, rt2, . . . ,$r_m$] and [qt1, qt2, . . . ,$q_m$], repeat the nonlinear relationship curve solving process as described above for the anchor codec. We obtain the nonlinear relationship curve, ft(x), between [rt1, rt2, . . . ,$r_m$] and [qt1, qt2, . . . ,$q_m$]. FIG. 7B shows an example nonlinear curve 702 as the fitting curve for the test codec data points (denoted by solid dot points).

The fitting curve derived with the aforementioned constraints can better capture the nonlinear relationship between bitrate and performance indicators (quality metrics). Specifically, it has the following characteristics: 1) At the middle bitrate points, there is an almost linear relationship between the performance indicators and the bitrate, and the performance indicators rise rapidly with the increase in bitrate. 2) When the bitrate increases to a certain extent, further increasing the bitrate may not bring additional gains in performance indicators, that is, the performance indicators enter a saturation area. 3) When the bitrate is reduced to a certain level, the performance indicators will not decrease with the reduction in bitrate.

Further, the constrained cubic curve-fitting method as proposed has the following advantages: 1) It gives valid values for all test cases as long as there are overlapping regions (e.g., overlapping x-axis values) between the two curves. 2) It is more transparent and consistent as all data points may be used for evaluation, compared to other methods, such as the BDExtend (pareto) method. 3) The cubic curve-fitting method achieves smaller fitting error than other methods, such as the BDExtend (pareto) method, therefore, it may provide more accurate quality metrics values, such as BD-rate values.

Step 950 may include calculating an integral area of the mapping curve in the given test interval for the samples encoded by the anchor encoder/decoder, and calculating an integral area of the fitted curve in the given test interval for the samples encoded by the test encoder/decoder. In some implementations, step 950 may include calculating integral of the obtained non-linear curve about anchor codec in a given integral range; and calculating integral of the obtained non-linear curve about test codec in a given integral range.

Step 960 may include calculating the average difference between the integral area corresponding to the test encoder/decoder and the integral area corresponding to the reference encoder/decoder. In some implementations, step 960 may include calculating the average of integral difference between anchor and test codec.

In some implementations, for the given performance evaluation interval [xa,xb], the method includes calculating the difference between integral area of fa (x) (i.e., curve 704 in FIG. 7B) and ft(x) (i.e., curve 702 in FIG. 7B) within the evaluation interval. This result will be denoted as BD-PSNR, which represents the average objective PSNR gain under the same bitrate. BD-PSNR may be calculated using equation below:

$$BD\text{-}PSNR = \frac{1}{xb-xa}\int_{xa}^{xb}[ft(x) - fa(x)]dx \qquad (5)$$

Refer to FIG. 7B for an example interval [xa, xb].

For the given performance evaluation interval [ya,yb], calculate the difference between the integral area of fa(x) (i.e., curve 704 in FIG. 7B) and ft(x) (i.e., curve 702 in FIG. 7B) within the evaluation interval [ya,yb]. This result can further be converted into BD-rate, which represents the average bitrate gain under the same objective PSNR. BD-rate may be calculated using equation below, $$BD\text{-}rate = 10^{\frac{1}{yb-ya}\int_{ya}^{yb}[ft^{-1}(y)-fa^{-1}(y)]dy} - 1 \qquad (6)$$

wherein ƒt and ƒa correspond to same functions as in the above equation. Refer to FIG. 7B for an example interval [ya, yb]. $ft^{-1}$ refers to an inverse function of ƒt, and $fa^{-1}$ refers to an inverse function of ƒa, wherein the inverse function of a function f is defined as a function that undoes the operation of f.

In some implementations, when ƒt and ƒa are fitted functions corresponding to y-values along y-axis (e.g., in FIG. 7B) as functional variable, BD-rate may be calculated using equation below:

$$BD\text{-}rate = 10^{\frac{1}{yb-ya}\int_{ya}^{yb}[ft(y)-fa(y)]dy} - 1 \qquad (7)$$

Step 970 may include transforming the average difference to obtain the performance gain of the test encoder/decoder relative to the reference encoder/decoder. In some implementations, step 970 may include calculating performance gain of test codec with regard to anchor codec using the average of integral difference.

In some embodiments, the codec performance evaluation method described above may be applied in video streaming applications. In such applications, a video server may serve (e.g., transmit video stream to) multiple end users simultaneously. Depending on the transmitting channel/link, the bit rate for the video streaming may be different. For example, user A may be covered by excellent WiFi signal and the link speed is over 200 Mbps (megabits per second), user B is under cellular coverage and the link speed may be around 50 Mbps, use C is under poor coverage and the link speed is only around 10 Mbps. For a same video source, there may be multiple versions of coded bitstreams, and these bitstreams may be encoded by different codecs. The codec performance evaluation tool according to this disclosure may be used to compare 3 codecs, with 3 bit rate ranges (in Mbps): [0, 20], [20, 100], and [100,300]. After the comparison, it turns out that:

Codec A outperforms in the bit rate range [0, 20];
Codec B outperforms in the bit rate range [20, 100]; and
Codec C outperforms in the bit rate range [100,300].

Therefore, based on each user's coverage condition, the video stream server may serve:

User A (link speed 200 Mbps) with bitstream encoded by codec C;
User B (link speed 50 Mbps) with bitstream encoded by codec B; and
User C (link speed 10 Mbps) with bitstream encoded by codec A.

In some embodiments, the similar concept may apply to an individual user with varying network coverage condition caused by, for example, user movement. When the user is moving, the available bandwidth may change due to factors like changing cellular signal strength or network coverage conditions. In such scenarios, a video streaming platform dynamically switch the video bitstream based on the codec used for the encoding. Specifically, a video streaming platform may employ a dynamic approach to deliver an optimal viewing experience based on the user's available bandwidth/link speed. By leveraging multiple encoded bitstreams (for same video source, for example, a same movie), the platform may intelligently select a bitstream encoded by a codec that outperforms other codecs within the specific bit rate range corresponding to the user's current link speed. This adaptive strategy ensures that the chosen bitstream is compressed using the most efficient codec for the given bandwidth constraints, thereby delivering the maximizing video quality which is adapted to the current link speed. Stated another way, for a same video chunk, multiple video bitstreams may be encoded by different codecs. Using the coded evaluation tool/algorithm provided in this disclosure, it is possible select an optimal bitstream encoded by the codec that outperforms other codecs in a specific bit rate range, and the specific bit rate range is determined by the bandwidth of a video streaming session.

In any portion or combination of the implementations above, at least one of following conditions satisfies: the m anchor data points are monotonically increasing; the m anchor data points are not monotonically increasing; the n test data points are monotonically increasing; or the n test data points are not monotonically increasing.

In any portion or combination of the implementations above, the m encoding parameters are the same as the n encoding parameters and m equals to n.

In any portion or combination of the implementations above, at least one of following conditions satisfies: an x-axis range of the m anchor data points and an x-axis range of the n test data points have overlap; or an x-axis range of the m anchor data points and an x-axis range of the n test data points have no overlap.

In any portion or combination of the implementations above, each of the anchor polynomial and the test polynomial is monotonic increasing.

The embodiments in this disclosure may be used to evaluation and compare two codecs, for example, a first codec and a second codec. In some example implementations, the first codec may be an anchor codec (benchmark codec), and the second codec may be a test codec. Specifically, the test codec may be a codec under development, and/or in a standardization process to be adopted to a video encoding/decoding standard.

Various embodiments and/or implementations described in the present disclosure may be performed separately or combined in any order, and may be applicable for evaluating codec performance with respect to any one or any combination of the following: decoding performance, encoding performance, or streaming performance. Further, each of the methods (or embodiments), encoder, and decoder may be implemented by processing circuitry (e.g., one or more processors or one or more integrated circuits). The one or more processors execute a program that is stored in a non-transitory computer-readable medium.

The present disclosure describes various embodiments for codec performance measurement and evaluation. Various embodiments in the present disclosure may be used for not only human but also machine consumptions, for example for Video Coding for Machines (VCM) scenarios as well as in general video coding/decoding systems.

Figure 11:
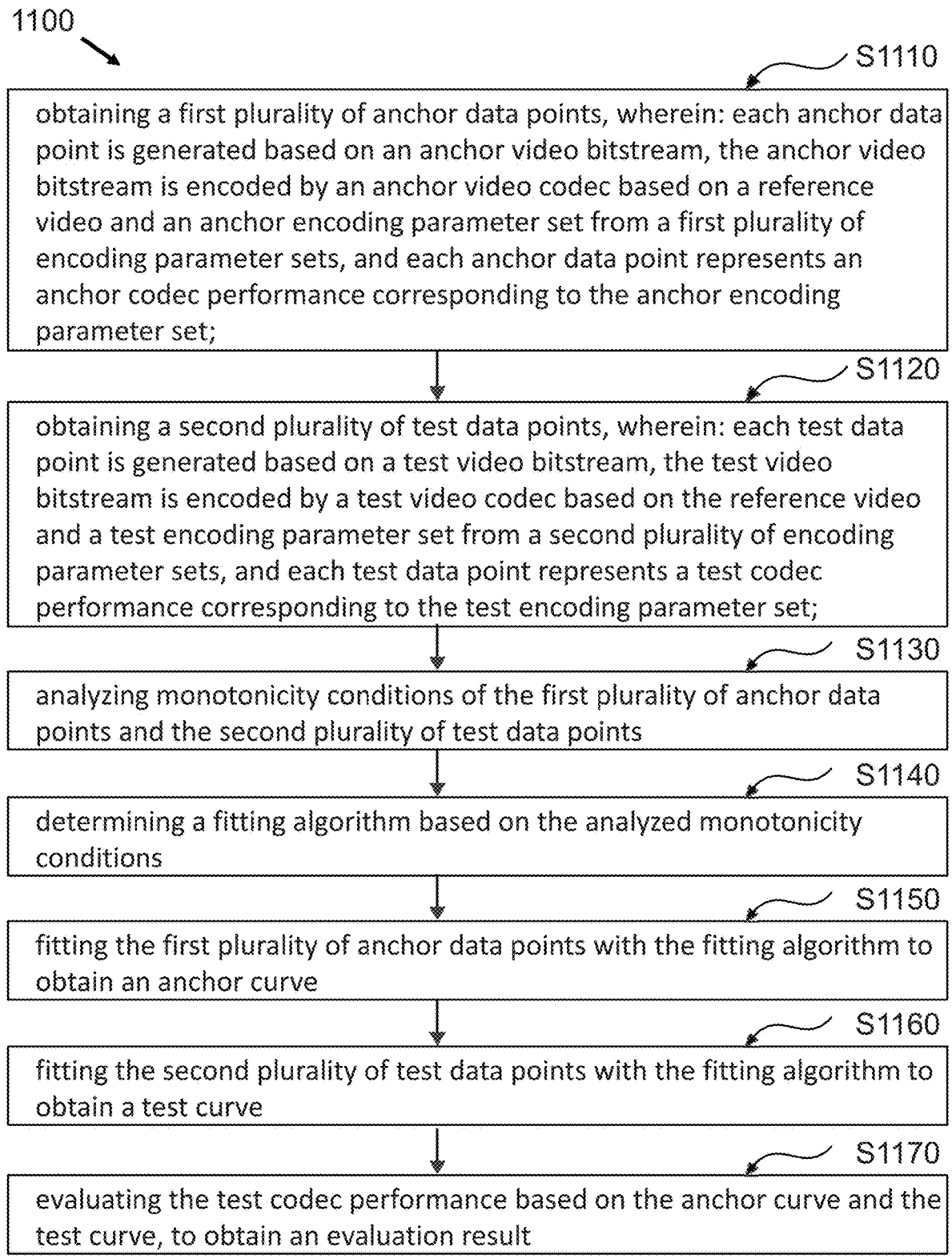
FIG. 11 shows a flow diagram of an exemplary codec evaluation method in the present disclosure.

FIG. 11 shows a flow chart 1100 of an exemplary method for codec performance measurement and evaluation following the principles underlying the implementations above. The exemplary method may be performed by an electronic device comprising a memory for storing instructions and at least one processor in communication with the memory, wherein, when the at least one processor executes the instructions, the at least one processor is configured to cause the electronic device to perform various steps of the exemplary method.

The exemplary method may include a portion or all of the following steps: S1110, obtaining a first plurality of anchor data points, wherein: each anchor data point is generated based on an anchor video bitstream, the anchor video bitstream is encoded by an anchor video codec based on a reference video and an anchor encoding parameter set from a first plurality of encoding parameter sets, and each anchor data point represents an anchor codec performance corresponding to the anchor encoding parameter set; S1120, obtaining a second plurality of test data points, wherein: each test data point is generated based on a test video bitstream, the test video bitstream is encoded by a test video codec based on the reference video and a test encoding parameter set from a second plurality of encoding parameter sets, and each test data point represents a test codec performance corresponding to the test encoding parameter set; S1130, analyzing monotonicity conditions of the first plurality of anchor data points and the second plurality of test data points; S1140, determining a fitting algorithm based on the analyzed monotonicity conditions; S1150, fitting the first plurality of anchor data points with the fitting algorithm to obtain an anchor curve; S1160, fitting the second plurality of test data points with the fitting algorithm to obtain a test curve; and/or S1170, evaluating the test codec performance based on the anchor curve and the test curve, to obtain an evaluation result.

In some implementations, in addition to any portion or combination of the embodiments and/or implementations in the present disclosure, the step of determining the fitting algorithm based on the analyzed monotonicity conditions may include when the analyzed monotonicity conditions are both monotonic, determining/selecting the fitting algorithm suitable for monotonic fitting (e.g., a cubic polynomial curve fitting, or a PCHIP); and/or when at least one of the analyzed monotonicity conditions is non-monotonic, determining/selecting the fitting algorithm suitable for non-monotonic fitting (e.g., a Constrained Cubic Curve Fitting).

In some implementations, in addition to any portion or combination of the embodiments and/or implementations in the present disclosure, the step of determining the fitting algorithm based on the analyzed monotonicity conditions may include when one of the analyzed monotonicity conditions is non-monotonic, determining a Constrained Cubic Curve Fitting as the fitting algorithm.

In some implementations, in addition to any portion or combination of the embodiments and/or implementations in the present disclosure, each anchor data point comprises a bit rate and a quality measurement corresponding to the anchor video bitstream; and/or each test data point comprises a bit rate and a quality measurement corresponding to the test video bitstream.

In some implementations, in addition to any portion or combination of the embodiments and/or implementations in the present disclosure, the fitting algorithm comprises a polynomial function:

$$f(x) = b_0 x^3 + b_1 x^2 + b_2 x + b_3$$

wherein: $b_0$, $b_1$, $b_2$, and $b_3$ are coefficients, an x-axis of the polynomial function represents a bit rate, and a y-axis of the polynomial function represents a quality measurement.

In some implementations, in addition to any portion or combination of the embodiments and/or implementations in the present disclosure, the step of fitting the first plurality of anchor data points with the fitting algorithm to obtain the anchor curve may include fitting the first plurality of anchor data points with the fitting algorithm and a constraint to obtain the anchor curve, wherein the constraint comprises, within an axis range, a first order derivative of the anchor curve being positive.

In some implementations, in addition to any portion or combination of the embodiments and/or implementations in the present disclosure, the step of fitting the first plurality of anchor data points with the fitting algorithm to obtain the anchor curve may include fitting the first plurality of anchor data points with the fitting algorithm and a constraint to obtain the anchor curve, wherein the constraint comprises, within an axis range, a first order derivative of the anchor curve being positive and a second order derivative of the anchor curve being negative.

In some implementations, in addition to any portion or combination of the embodiments and/or implementations in the present disclosure, the step of fitting the second plurality of test data points with the fitting algorithm to obtain the test curve may include fitting the second plurality of test data points with the fitting algorithm and a constraint to obtain the test curve, wherein the constraint comprises, within an axis range, a first order derivative of the test curve being positive.

In some implementations, in addition to any portion or combination of the embodiments and/or implementations in the present disclosure, the step of fitting the second plurality of test data points with the fitting algorithm to obtain the test curve may include fitting the second plurality of test data points with the fitting algorithm and a constraint to obtain the test curve, wherein the constraint comprises, within an axis range, a first order derivative of the test curve being positive and a second order derivative of the test curve being negative.

In some implementations, in addition to any portion or combination of the embodiments and/or implementations in the present disclosure, the method may include deriving a Bjøntegaard Delta Peak Signal-to-Noise Ratio (BD-PSNR) with $$BD-PSNR = \frac{1}{xb-xa}\int_{xa}^{xb}[ft(x)-fa(x)]dx$$

wherein: $fa$ and $ft$ represent the anchor curve and the test curve, respectively, and $xa$ and $xb$ are a start and an end of an x-axis range, respectively.

In some implementations, in addition to any portion or combination of the embodiments and/or implementations in the present disclosure, the method may include deriving a Bjøntegaard Delta Rate (BD-rate) with $$BD-\text{rate} = 10^{\frac{1}{yb-ya}\int_{ya}^{yb}[ft(y)-fa(y)]dy}-1$$

wherein: $fa$ and $ft$ represent the anchor curve and the test curve, respectively, and $ya$ and $yb$ are a start and an end of a quality measurement interval in a y-axis range, respectively.

In some implementations, in addition to any portion or combination of the embodiments and/or implementations in the present disclosure, the method may include when the evaluation result indicates that the anchor video codec outperforms the test video codec within an axis range and a link speed of a video streaming session is within the axis range, selecting an encoded video bitstream encoded by the anchor video codec for the video streaming session; and/or when the evaluation result indicates that the test video codec outperforms the anchor video codec within the axis range and a link speed of a video streaming session is within the axis range, selecting an encoded video bitstream encoded by the test video codec for the video streaming session.

In some implementations, in addition to any portion or combination of the embodiments and/or implementations in the present disclosure, the method may include transmitting the selected encoded video bitstream in the video streaming session.

In some implementations, in addition to any portion or combination of the embodiments and/or implementations in the present disclosure, the method may include when the evaluation result indicates that the anchor video codec outperforms the test video codec within an axis range and a link speed of a video streaming session is within the axis range, selecting the anchor video codec as a preferred video codec for the video streaming session; and/or when the evaluation result indicates that the test video codec outperforms the anchor video codec within the axis range and a link speed of a video streaming session is within the axis range, selecting the test video codec as the preferred video codec for the video streaming session.

In some implementations, in addition to any portion or combination of the embodiments and/or implementations in the present disclosure, the method may include using the preferred video codec for the video streaming session.

In some implementations, in addition to any portion or combination of the embodiments and/or implementations in the present disclosure, the first plurality of encoding parameter sets are the same as the second plurality of encoding parameter sets.

In some implementations, in addition to any portion or combination of the embodiments and/or implementations in the present disclosure, at least one of following conditions satisfies: a first axis range of the first plurality of anchor data points and a first axis range of the second plurality of test data points have overlap; or a first axis range of the first plurality of anchor data points and a first axis range of the second plurality of test data points have no overlap.

In some implementations, in addition to any portion or combination of the embodiments and/or implementations in the present disclosure, the at least one of following conditions satisfies: the first plurality of anchor data points are monotonically increasing; the first plurality of anchor data points are non-monotonic; the second plurality of test data points are monotonic; and/or the second plurality of test data points are non-monotonic.

Various embodiments in the present disclosure may include methods for downsampling a video bitstream, which are performed by an encoder, including inverse processes as any portion or all of the processes that are described for the decoder.

Various embodiments in the present disclosure may include methods for encoding and/or decoding a streaming video, which are performed by one or more electronic device (e.g., streaming media player), including any portion or all of the processes for the decoder and/or any portion or all of the processes that are described for an encoder.

Operations above may be combined or arranged in any amount or order, as desired. Two or more of the steps and/or operations may be performed in parallel. Embodiments and implementations in the disclosure may be used separately or combined in any order. Steps in one embodiment/method may be split to form multiple sub-methods, each of the sub-methods may be independent of other steps in the embodiment and may form a standalone solution. Further, each of the methods (or embodiments) may be performed by a device, and the device may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 12 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
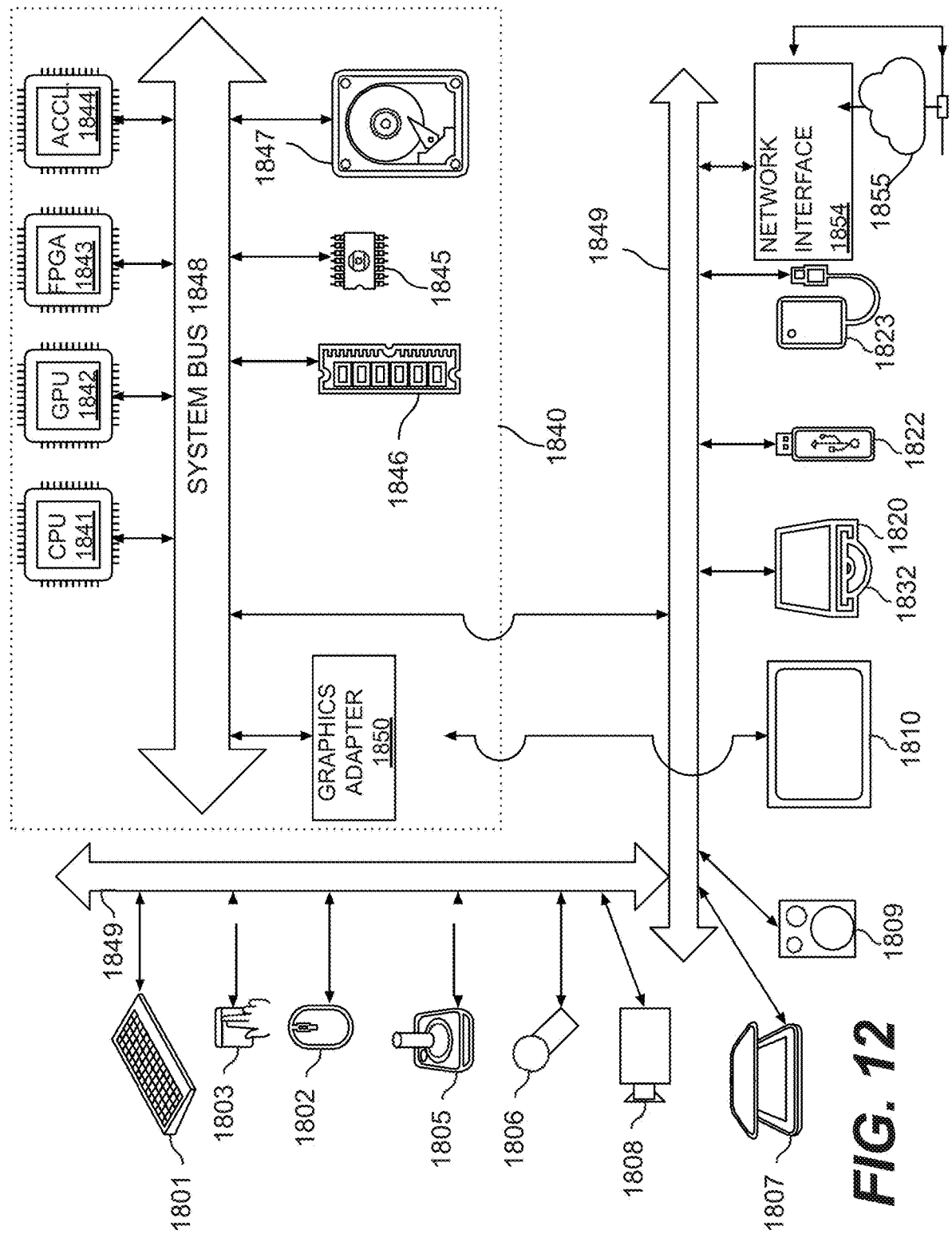
FIG. 12 shows a schematic illustration of a computer system in accordance with example embodiments of this disclosure.

The components shown in FIG. 12 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE, 6G, and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing video data, performed by an electronic device comprising a memory for storing instructions and a processor in communication with the memory, the method comprising:
   obtaining a first plurality of anchor data points, wherein:
   each anchor data point is generated based on an anchor video bitstream,
   the anchor video bitstream is encoded by an anchor video codec based on a reference video and an anchor encoding parameter set from a first plurality of encoding parameter sets, and each anchor data point represents an anchor codec performance corresponding to the anchor encoding parameter set;

obtaining a second plurality of test data points, wherein:
each test data point is generated based on a test video bitstream,
the test video bitstream is encoded by a test video codec based on the reference video and a test encoding parameter set from a second plurality of encoding parameter sets, and
each test data point represents a test codec performance corresponding to the test encoding parameter set;

analyzing monotonicity conditions of the first plurality of anchor data points and the second plurality of test data points;

determining a fitting algorithm based on the analyzed monotonicity conditions;

fitting the first plurality of anchor data points with the fitting algorithm to obtain an anchor curve;

fitting the second plurality of test data points with the fitting algorithm to obtain a test curve; and evaluating the test codec performance based on the anchor curve and the test curve, to obtain an evaluation result.

2. The method of claim 1, wherein the determining the fitting algorithm based on the analyzed monotonicity conditions comprises:
when the analyzed monotonicity conditions are both monotonic, determining one of the following as the fitting algorithm: a cubic polynomial curve fitting, or a Piecewise Cubic Hermit Interpolation (PCHIP); and
when at least one of the analyzed monotonicity conditions is non-monotonic, determining a Constrained Cubic Curve Fitting as the fitting algorithm.

3. The method of claim 1, wherein the determining the fitting algorithm based on the analyzed monotonicity conditions comprises:
when one of the analyzed monotonicity conditions is non-monotonic, determining a Constrained Cubic Curve Fitting as the fitting algorithm.

4. The method of claim 1, wherein:
each anchor data point comprises a bit rate and a quality measurement corresponding to the anchor video bitstream; and
each test data point comprises a bit rate and a quality measurement corresponding to the test video bitstream.

5. The method of claim 1, wherein:
the fitting algorithm comprises a polynomial function:

$$f(x) = b_0 x^3 + b_1 x^2 + b_2 x + b_3$$

wherein:
$b_0$, $b_1$, $b_2$, and $b_3$ are coefficients,
an x-axis of the polynomial function represents a bit rate, and
a y-axis of the polynomial function represents a quality measurement.

6. The method of claim 1, wherein the fitting the first plurality of anchor data points with the fitting algorithm to obtain the anchor curve comprises:
fitting the first plurality of anchor data points with the fitting algorithm and a constraint to obtain the anchor curve, wherein the constraint comprises, within an axis range, a first order derivative of the anchor curve being positive.

7. The method of claim 1, wherein the determining the fitting the first plurality of anchor data points with the fitting algorithm to obtain the anchor curve comprises:
fitting the first plurality of anchor data points with the fitting algorithm and a constraint to obtain the anchor curve, wherein the constraint comprises, within an axis range, a first order derivative of the anchor curve being positive and a second order derivative of the anchor curve being negative.

8. The method of claim 1, wherein the fitting the second plurality of test data points with the fitting algorithm to obtain the test curve comprises:
fitting the second plurality of test data points with the fitting algorithm and a constraint to obtain the test curve, wherein the constraint comprises, within an axis range, a first order derivative of the test curve being positive.

9. The method of claim 1, wherein the fitting the second plurality of test data points with the fitting algorithm to obtain the test curve comprises:
fitting the second plurality of test data points with the fitting algorithm and a constraint to obtain the test curve, wherein the constraint comprises, within an axis range, a first order derivative of the test curve being positive and a second order derivative of the test curve being negative.

10. The method of claim 1, further comprising:
deriving a Bjøntegaard Delta Peak Signal-to-Noise Ratio (BD-PSNR) with $$BD\text{-}PSNR = \frac{1}{xb - xa} \int_{xa}^{xb} [ft(x) - fa(x)]dx$$

wherein: $fa$ and $ft$ represent the anchor curve and the test curve, respectively, and xa and xb are a start and an end of an x-axis range, respectively.

11. The method of claim 1, further comprising:
deriving a Bjøntegaard Delta Rate (BD-rate) with $$BD\text{-rate} = 10^{\frac{1}{yb-ya}\int_{ya}^{yb}[ft(y)-fa(y)]dy} - 1$$

wherein: $fa$ and $ft$ represent the anchor curve and the test curve, respectively, and ya and yb are a start and an end of a quality measurement interval in a y-axis range, respectively.

12. The method of claim 1, further comprising:
when the evaluation result indicates that the anchor video codec outperforms the test video codec within an axis range and a link speed of a video streaming session is within the axis range, selecting an encoded video bitstream encoded by the anchor video codec for the video streaming session; and
when the evaluation result indicates that the test video codec outperforms the anchor video codec within the axis range and a link speed of a video streaming session is within the axis range, selecting an encoded video bitstream encoded by the test video codec for the video streaming session.

13. The method of claim 12, further comprising:
transmitting the selected encoded video bitstream in the video streaming session.

14. The method of claim 1, further comprising:
when the evaluation result indicates that the anchor video codec outperforms the test video codec within an axis range and a link speed of a video streaming session is within the axis range, selecting the anchor video codec as a preferred video codec for the video streaming session; and
when the evaluation result indicates that the test video codec outperforms the anchor video codec within the axis range and a link speed of a video streaming session is within the axis range, selecting the test video codec as the preferred video codec for the video streaming session.

15. The method of claim 14, further comprising:
using the preferred video codec for the video streaming session.

16. An apparatus for processing video data, the apparatus comprising:
a memory storing instructions; and
a processor in communication with the memory, wherein, when the processor executes the instructions, the processor is configured to cause the apparatus to:
obtain a first plurality of anchor data points, wherein:
each anchor data point is generated based on an anchor video bitstream,
the anchor video bitstream is encoded by an anchor video codec based on a reference video and an anchor encoding parameter set from a first plurality of encoding parameter sets, and
each anchor data point represents an anchor codec performance corresponding to the anchor encoding parameter set;
obtain a second plurality of test data points, wherein:
each test data point is generated based on a test video bitstream,
the test video bitstream is encoded by a test video codec based on the reference video and a test encoding parameter set from a second plurality of encoding parameter sets;
each test data point represents a test codec performance corresponding to the test encoding parameter set;
analyze monotonicity conditions of the first plurality of anchor data points and the second plurality of test data points;
determine a fitting algorithm based on the analyzed monotonicity conditions;
fit the first plurality of anchor data points with the fitting algorithm to obtain an anchor curve;
fit the second plurality of test data points with the fitting algorithm to obtain a test curve; and
evaluate the test codec performance based on the anchor curve and the test curve, to obtain an evaluation result.

17. The apparatus of claim 16, wherein, when the processor is configured to cause the apparatus to determine the fitting algorithm based on the analyzed monotonicity conditions, the processor is configured to cause the apparatus to:
when the analyzed monotonicity conditions are both monotonic, determine one of the following as the fitting algorithm: a cubic polynomial curve fitting, or a Piecewise Cubic Hermit Interpolation (PCHIP); and
when at least one of the analyzed monotonicity conditions is non-monotonic, determine a Constrained Cubic Curve Fitting as the fitting algorithm.

18. The apparatus of claim 16, wherein, when the processor is configured to cause the apparatus to fit the first plurality of anchor data points with the fitting algorithm to obtain the anchor curve, the processor is configured to cause the apparatus to:
fit the first plurality of anchor data points with the fitting algorithm and a constraint to obtain the anchor curve, wherein the constraint comprises, within an axis range, a first order derivative of the anchor curve being positive and a second order derivative of the anchor curve being negative.

19. A non-transitory computer readable storage medium storing instructions, wherein, when the instructions are executed by a processor, the instructions are configured to cause the processor to:
obtain a first plurality of anchor data points, wherein:
each anchor data point is generated based on an anchor video bitstream,
the anchor video bitstream is encoded by an anchor video codec based on a reference video and an anchor encoding parameter set from a first plurality of encoding parameter sets, and
each anchor data point represents an anchor codec performance corresponding to the anchor encoding parameter set;
obtain a second plurality of test data points, wherein:
each test data point is generated based on a test video bitstream,
the test video bitstream is encoded by a test video codec based on the reference video and a test encoding parameter set from a second plurality of encoding parameter sets;
each test data point represents a test codec performance corresponding to the test encoding parameter set;
analyze monotonicity conditions of the first plurality of anchor data points and the second plurality of test data points;
determine a fitting algorithm based on the analyzed monotonicity conditions;
fit the first plurality of anchor data points with the fitting algorithm to obtain an anchor curve;
fit the second plurality of test data points with the fitting algorithm to obtain a test curve; and
evaluate the test codec performance based on the anchor curve and the test curve, to obtain an evaluation result.

20. The non-transitory computer readable storage medium according to claim 19, wherein, when the instructions are configured to cause the processor to determine the fitting algorithm based on the analyzed monotonicity conditions, the instructions are configured to cause the processor to:
when the analyzed monotonicity conditions are both monotonic, determine one of the following as the fitting algorithm: a cubic polynomial curve fitting, or a Piecewise Cubic Hermit Interpolation (PCHIP); and
when at least one of the analyzed monotonicity conditions is non-monotonic, determine a Constrained Cubic Curve Fitting as the fitting algorithm.

* * * * *